G. W. Wesley,
Water Wheel,
No. 84,035. Patented Nov. 10, 1868.

Witnesses
Inventor:
George W. Wesley

GEORGE W. WESLEY, OF TROY, PENNSYLVANIA.

*Letters Patent No. 84,035, dated November 10, 1868.*

IMPROVEMENT IN WATER-WHEELS.

The Schedule referred to in these Letters Patent and making part of the same.

*To all whom it may concern:*

Be it known that I, GEORGE W. WESLEY, of Troy, in the county of Crawford, and State of Pennsylvania, have invented a new and improved Combined Percussion and Reaction-Wheel; and I do hereby declare that the following is a full and exact description of the same, reference being had to the accompanying drawings, and the letters of reference marked thereon.

Figure 1:
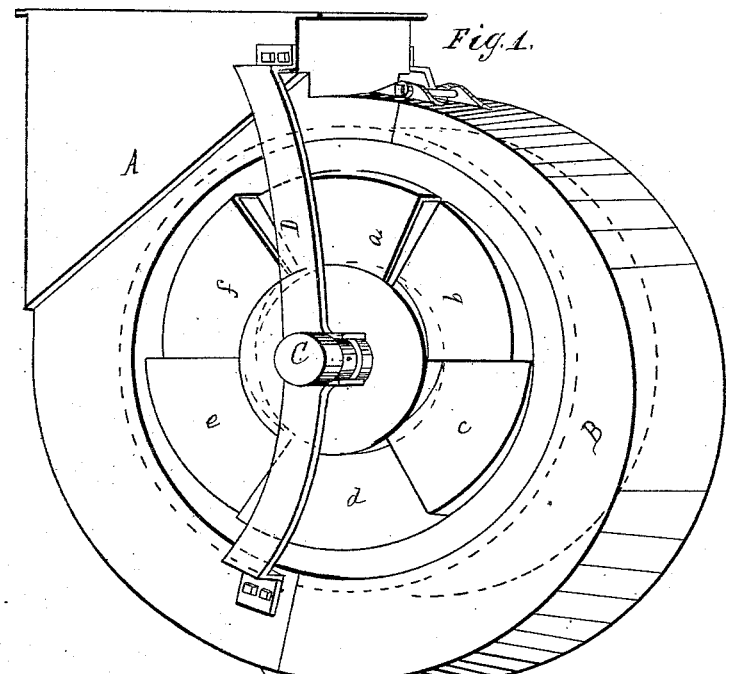

Figure 1 represents a side view of the wheel in the position in which it is used.

Letter A in said figure represents the location of the flume-gate; B, the enclosure or scroll; C, the end of the wheel-shaft; and small letters *a b c d e f*, side issues, or reacting-boards and water-escapes, the form of the openings being indicated by the dark shades of small lettered parts just named.

Figure 2:
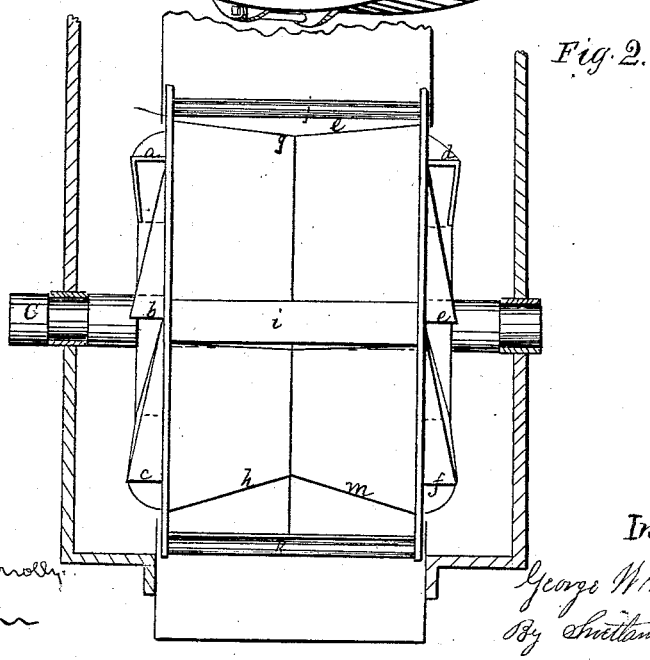

Figure 2 represents the face-view of the wheel as it hangs on the shaft, and not in any manner enclosed.

Letters *a b c d e f* represent, the same as in fig. 1, the water-escapes, but present the front view, showing their angular form, and also their position on the wheel. Letters *g* and *h*, the water-buckets, *g* upon the upper and *h* on the lower side of the wheel. Letters *i j k* represent the rear or one edge of the buckets, with its raised form for retention of water. The letters *l* and *m* represent the concaved or depressed lines, indicating the form of the water-buckets in the wheel represented by letters *g* and *h*.

The buckets are constructed with the centre depression, so that when the water passes from the flume A upon the bucket *g*, it is carried to the centre of the bucket by its concave form, and thereby kept in a more close body, and longer retained in the bucket. This form of bucket creates a corresponding convex surface on the inner or under side. The raised edge of the bucket, shown by letters *i, j*, and *k*, prevents the dashing over and waste of the water, so that the entire receipt or supply of water upon the bucket passes from its inner edge into the wheel, and on to the convex surface of the next bucket, which carries the water outward either way to the sides of the wheel, and thus conveys it into the side-issues or escapes *a, b, c, d, e*, and *f*, and thence into the race-way of the wheel, thereby creating a continued use of the water for power, nearly twice the time it is ordinarily used, or can be retained in the bucket alone, the water being continued in the same direction, in its current and bearing, from the time it enters until it leaves the wheel.

What I claim, therefore, as my invention, and desire to secure by Letters Patent, is—

A water-wheel having buckets of a concave or depressed outer surface, and with a corresponding convex or raised inner surface, in combination with the side-issues or escapes, for the purposes and in the manner set forth and described.

GEORGE W. WESLEY.

Witnesses:
 A. B. RICHMOND,
 FRANK P. RAY.